United States Patent
Baer et al.

(10) Patent No.: US 9,792,015 B2
(45) Date of Patent: Oct. 17, 2017

(54) PROVIDING VISUALIZATIONS FOR CONVERSATIONS

(71) Applicant: Microsoft Corporation, Redmond, WA (US)

(72) Inventors: Matthias Baer, Seattle, WA (US); Ned Bearer Friend, Seattle, WA (US); Nicholas Smith, Redmond, WA (US); Bryan Eric Baird, Seattle, WA (US); Benjamin Franklin Carter, Redmond, WA (US); Hiroshi Tsukahara, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 376 days.

(21) Appl. No.: 14/032,151

(22) Filed: Sep. 19, 2013

(65) Prior Publication Data

US 2015/0082189 A1    Mar. 19, 2015

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0482* (2013.01); *G06F 3/04817* (2013.01)

(58) Field of Classification Search
CPC . G06F 15/16; G06F 3/048; G06F 3/01; G06F 17/13; H04L 51/00; H04M 3/42; H04M 1/64; H04Q 7/22
See application file for complete search history.

(56) References Cited

U.S. PATENT DOCUMENTS 7,506,263 B1 * 3/2009 Johnston ............. G06Q 10/107
                                                      709/206
8,136,051 B2    3/2012 Friedlander et al.
(Continued)

OTHER PUBLICATIONS

Zhu, et al., "Context-Aware Informative Display", In IEEE International Conference on Multimedia and Expo, Jul. 2, 2007, 4 pages.
(Continued)

*Primary Examiner* — Rashawn Tillery
(74) *Attorney, Agent, or Firm* — Turk IP Law, LLC

(57) ABSTRACT

Technologies are generally described for providing a system for visualizing items and conversations in a communication application. Conversations are presented as a list of items in the communication application. A quantity of presented items is limited based on a size of a client device employed for viewing the items. Visualizations are applied to the presented items to attempt to maximize a number of items that are presented while providing information about the items to enable a user to preview content and take actions on the items. The visualizations include different templates applied to each item based on a type of item and content associated with the item, and the templates may be are dynamically updated based on user interactions with the items. The templates for items are determined by applying a set of rules and factors to each item to determine a most appropriate visualization for each item.

15 Claims, 9 Drawing Sheets

(51) Int. Cl.
*G06F 3/0481* (2013.01)
*G06F 3/0482* (2013.01)

(56) References Cited

U.S. PATENT DOCUMENTS

| | | | |
|---|---|---|---|
| 9,049,261 B2* | 6/2015 | Shiplacoff | G06F 3/04842 |
| 2005/0144573 A1 | 6/2005 | Moody et al. | |
| 2006/0123360 A1* | 6/2006 | Anwar | G06F 3/0482 |
| | | | 715/810 |
| 2007/0264948 A1 | 11/2007 | Jansson et al. | |
| 2008/0043943 A1 | 2/2008 | Sipher et al. | |
| 2008/0171535 A1* | 7/2008 | Carmody | H04M 1/72552 |
| | | | 455/412.2 |
| 2009/0042542 A1* | 2/2009 | Dias | H04M 1/72552 |
| | | | 455/412.1 |
| 2009/0327883 A1 | 12/2009 | Robertson et al. | |
| 2009/0327972 A1* | 12/2009 | McCann | G06F 17/30528 |
| | | | 715/853 |
| 2010/0162138 A1 | 6/2010 | Pascal et al. | |
| 2010/0162174 A1 | 6/2010 | Karidi et al. | |
| 2010/0273457 A1 | 10/2010 | Freeman et al. | |
| 2011/0004831 A1 | 1/2011 | Steinberg et al. | |
| 2011/0072363 A1* | 3/2011 | Mandel | G06Q 10/107 |
| | | | 715/752 |
| 2011/0145353 A1* | 6/2011 | Yuyama | G06Q 10/107 |
| | | | 709/206 |
| 2011/0145744 A1* | 6/2011 | Haynes | G06F 3/0481 |
| | | | 715/766 |
| 2011/0231499 A1* | 9/2011 | Stovicek | H04M 1/72547 |
| | | | 709/206 |
| 2012/0047460 A1 | 2/2012 | McCann et al. | |
| 2012/0158843 A1* | 6/2012 | Angani | G06Q 50/01 |
| | | | 709/204 |
| 2012/0185797 A1* | 7/2012 | Thorsen | G06Q 10/00 |
| | | | 715/784 |
| 2012/0191716 A1 | 7/2012 | Omoigui | |
| 2013/0091465 A1 | 4/2013 | Kikin-Gil et al. | |
| 2013/0125063 A1* | 5/2013 | Lee | G06F 3/04883 |
| | | | 715/854 |
| 2013/0262438 A1* | 10/2013 | Palay | G06F 17/30312 |
| | | | 707/722 |

OTHER PUBLICATIONS

Ali, et al., "Adaptive Layout for Interactive Documents", In Proceedings of the 9th International Symposium on Smart Graphics, Aug. 27, 2008, 8 pages.

"International Search Report and Written Opinion Issued in PCT Application No. PCT/US2014/055970", Mailed Date: Apr. 13, 2015, 8 Pages.

* cited by examiner

PROVIDING VISUALIZATIONS FOR CONVERSATIONS

BACKGROUND

Email applications are widely used by users on a variety of client devices for non-real time correspondence. With the proliferation of computing and networking technologies, email use has become an inextricable part of daily personal and professional lives. The increased reliance on email brings with it the disadvantage of how to deal with increasingly large numbers of emails. It is a common occurrence to find hundreds of email needing attention (at least a quick review) when a person comes back from vacation or comparable absence. Similarly, certain events (e.g., a product release, a conference, etc.) may generate a large number of received emails when the person receiving the emails may be too busy to deal with the increased volume.

Users may receive a large quantity of emails hourly and daily, and sorting through hundreds and even thousands of emails to find important emails that need to be dealt with can be arduous, inefficient, and time consuming. Spending a significant time going through emails can be stressful and overwhelming, and users may feel that it is difficult to catch up and read through everything to find and keep track of important emails and to efficiently manage emails.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a system for visualizing items and conversations, such as emails, in a communication application. Conversations may be presented as a list of items in an inbox of the communication application. A quantity of items that may be presented in the list of items may be limited based on a size of a client device employed for viewing the items. The communication application may apply visualizations to presented items to attempt to maximize a number of items that may be presented while providing information about the items that may enable a user to preview content of the items and take actions on the items. The visualizations may include different templates and annotations applied to each item based on a type of item and content associated with the item, and the templates may be dynamically updated based on user interactions with the items. The templates and annotations for items may be determined by applying a set of rules and factors to each item to determine a most appropriate visualization for each item.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
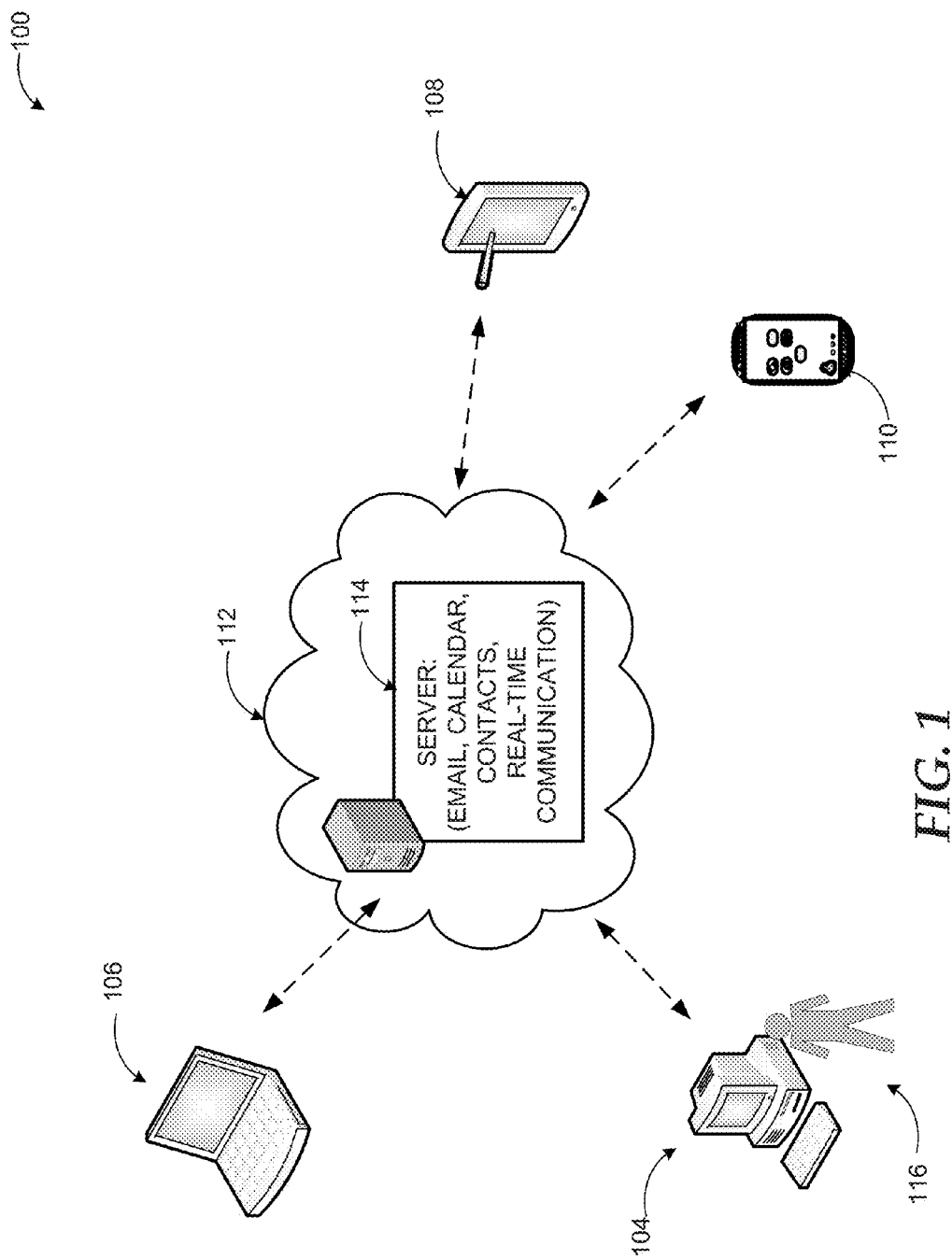
FIG. 1 illustrates an example networked environment where a system for providing visualizations associated with conversations on a client device may be employed.

As briefly described above, a system is described for providing visualizations for items and conversations in a communication application. A conversation as used herein may refer to a single message, multiple messages sharing a common theme (e.g., common subject, common sender, common receiver, etc.), or any exchanged items (e.g., documents, audio files, video files, and other data) that are part of a common theme and are exchanged via the communication application. A quantity of presented items in an inbox of a communication application may be limited based on a size of a client device employed for viewing the items. Visualizations may be applied to the presented items to attempt to maximize a number of items that are presented while providing information about the items to enable a user to preview content and take actions on the items. The visualizations may include a variety of templates applied to each item based on a type of item and content associated with the item. The templates may be determined by applying a set of rules and factors to each item to determine an appropriate visualization for each item.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Throughout this specification, the term "platform" may be a combination of software and hardware components for providing a system to facilitate providing visualizations associated with conversations in a communication application. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

According to embodiments, a client device may be a touch or gesture-enabled device, such that hand gestures and finger touch may be recognized as input methods on the user interface of the client device for interacting with, controlling, and providing content to the client device. The client device may also work with a traditional mouse and keyboard. A touch or gesture-enabled device may recognize touch actions such as a tap, a swipe, a pinch, expand, and a drag, as some examples. Touch actions, such a tap, swipe, pinch, expand, and drag, and other similar actions as used herein may be provided by a user through a finger, a pen, a mouse, or similar device, as well as through predefined keyboard entry combinations, a voice command, or an eye-tracking input.

FIG. 1 illustrates an example networked environment, where a system for providing visualizations associated with conversations on a client device may be employed. In a collaborative environment, as demonstrated in diagram 100, a user 116 may employ a variety of different client devices to communicate with other users. For example, a communication application executed on the client devices may enable email exchange, instant messaging, voice over IP (VOIP), audio and video conferencing, and phone calls. The communication application may be executed on the client device, and may be connected with a server 114 and with other client devices over a network 112. The network 112 may be a wired or wireless network, or a cloud network. The server 114 providing the communications through the communication application may also provide other features accessible at the client devices over the network such as calendar applications, word processing applications, contacts management, and presence detection. The communication application and other applications may be integrated together to enable the applications to communicate with each other to exchange information for seamless coordination of communicating, collaborating, and information exchange.

Some example client devices for viewing emails may include a desktop computing device 104, a personal computer 106, a tablet 108, a smartphone 110, a whiteboard and other similar client devices. The client devices may be configured to enable touch and gesture interaction, such that the user 116 may interact with a document, or a conversation such as an email, viewed on the user's client device employing touch and gesture actions on the user interface of the client device.

In some example embodiments, a large quantity of emails and conversations may be received daily at a communication application. Example emails may include important business and personal emails, as well as less important emails which may include shopping, news, entertainment, recreational, and other low importance emails. Other conversations may include instant messages, emails to schedule meetings, conference calls, and shared documents. When the user 116 receives a large quantity of emails, the user 116 may need to be able to quickly sort through the user's inbox to quickly find, view, and reply to important emails.

In some scenarios, the communication application may be configured to display conversations, such as emails, in different configurations based on the type of computing device for optimizing how a user views and interacts with emails on the computing device. For example, a personal computer or desktop device may have more viewing space on the user interface such that a larger quantity of emails may be viewed at a time, as well as some detailed preview information about an email may be provided. A tablet or smartphone, however, may have a smaller user interface and thus more limited viewing space for displaying emails. As a result of a smaller user interface, fewer emails may be displayed on an email application executed on a smart phone or tablet, and when the user 116 views emails on a tablet or smartphone, it may be even more difficult to parse through a large quantity of unread and unsorted emails quickly and efficiently. A user may desire to view enough summary information about an email to know what it is about, but also to view a larger quantity of emails in the user's inbox. A system according to embodiments may facilitate providing preview information about conversations presented in an inbox and enabling a user to take actions on a conversation directly from the inbox, while maximizing a quantity of presented items in the inbox.

Figure 2A:
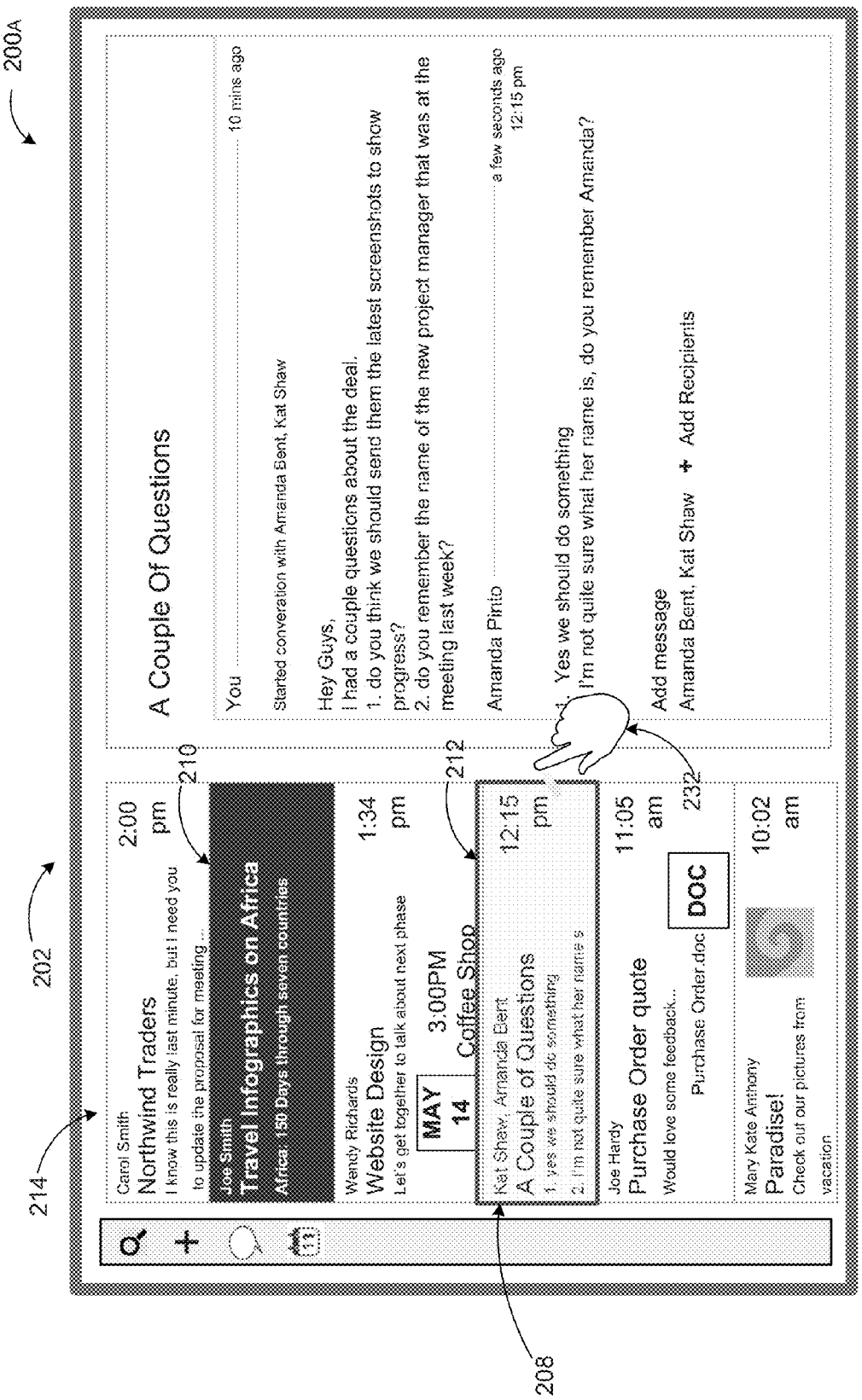
FIGS. 2A and 2B illustrate example visualizations of a selected conversation and a read conversation.
Figure 2B:
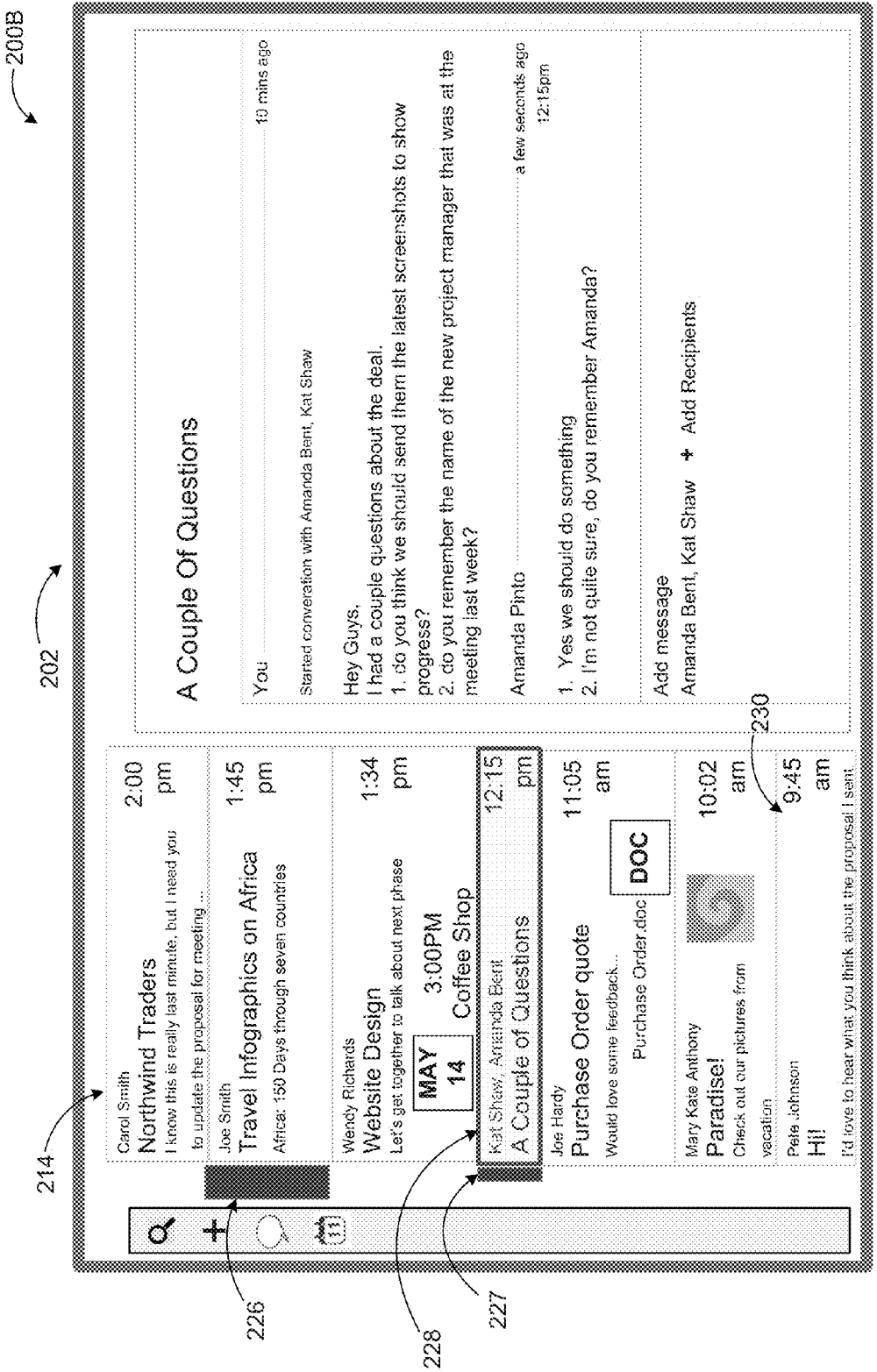

FIGS. 2A and 2B illustrate example visualizations of a selected conversation and a read conversation, according to some example embodiments.

As illustrated in diagram 200, conversations displayed in an inbox 214 of a communication application 202 may be presented with different visualizations to enable a user to quickly scan the inbox 214 to see an overview of new, unread, and previously seen conversations, to identify types of conversations, and to decide a priority of the conversations. A system according to embodiments may provide a visualization of a conversation based on a detected input by a user when interacting with the conversations. Based on the input and different data about a selected conversation or item, the system may choose a visualization that is most appropriate and most useful to the user at any given time. The selected visualization may be advantageous in that it may strike a balance between providing enough information about a conversation to enable the user to determine what a conversation is about, and displaying a larger number of conversations in the inbox 214 on a user interface associated with the communication application 202. Additionally, the visualizations may be visually appealing to enhance a conversation experience, and to aid in enabling a user to recall and find certain conversations based on provided visual cues rather than strictly text-based cues.

In an example embodiment, a system for visualizing conversations in the inbox 214 may involve a collection of templates, rules, factors, and annotations. The collection of templates may include visually distinct layouts for a presentation of information associated with a conversation in the inbox 214. The annotations may include additional pieces of information that may be applied to a template to modify the template and may provide additional information. For example, the annotations may indicate a currently selected item, or that an item has been marked as important. The rules may be applied to determine the template and annotations to display for any given item or conversation in the inbox 214. The rules may test one or more of the factors to determine the annotations and templates to apply to a visualization for an item.

In an example embodiment, example visualization templates may be an unread conversation template and a read item template. Upon detection of a selection of a conversation 208 to view, read and/or reply to, the conversation may be transitioned from the unread template as shown in diagram 200A, to the read template 228 as shown in diagram 200B. The unread template for the selected conversation 208 may display the sender name, time and date received, a subject and a short preview of the body of the conversation so that the user can preview the message to see what it is about and decide what actions to take. The read template 228 may hide some of the details such as the preview of the body of the message, and may display the sender, subject and time and date information only in order to reduce a size of the conversation displayed in the inbox 214. When the conversation is reduced in size, it may take up less space in the inbox 214 to enable one or more additional conversations 230 to be viewed in the inbox 214, while still providing enough information to enable the user to remember what that conversation was about. In another example, in the unread state, the conversation may take up less space in the inbox 214, and after the conversation has been read, a read template may provide more information about the conversation such that the read conversation may occupy more space in the inbox 214 than an unread conversation. For example, the system may determine that the user has expressed interest in the read conversation, and more details about the read conversation may be provided to enable the user to quickly scan and find the conversation in the inbox.

Other templates may also be implemented. For example, as will be described in further detail below, a template may display a preview or thumbnail view of attachments included in the body of the message and may also enable an action to be taken from the preview template of the conversation without opening the conversation. The template may be chosen by applying the set of rules to determine the template selection. An example rule may be if the item is a conversation the user has not read before, then use the unread template, and if the item is a conversation that the user has seen before, then use the read template.

In another example, the system may provide annotations with template visualizations to provide additional information about a conversation. For example, there might be an annotation showing whether a current conversation item is selected by showing a box 212 around the selected conversation 208, changing a background color 210 of the selected conversation. Another example annotation may be an icon displayed adjacent to the conversation preview in the inbox 214 to show whether the item has been flagged or starred, whether the item is protected with security permissions, and an importance of the message, to name a few. The annotations may be applied regardless of the selected template.

In a system according to embodiments, as illustrated in diagram 200B, another example annotation may be an indicator, such as a vertical bar (226, 227) displayed adjacent to a conversation to provide information about whether the conversation has been read, replied to, interacted with, and the like. The vertical bar may change color based on whether the conversation has been read or not, and the vertical bar may change size or width based on previous interactions by the user with the conversation. For example, if the user has replied multiple times to the conversation, then the vertical bar may be fairly wide, while if the user has only viewed the conversation one time, the vertical bar may be a thin line. The size and color of the vertical bar may provide a hint to the user that the conversation may be more important than other conversations in the inbox 214. Other indicators, and graphical, shading, highlighting, and color schemes may also be used to annotate a conversation to provide information to the user about the conversation.

In a system according to embodiments, touch 232 and gesture interactions may be employed to enable a user to interact with the communication application 202 to scroll through the inbox 214, select a conversation, and perform actions associated with the conversations. Example touch actions may include a tap and hold, swipe, drag, pinch, and other similar actions. Other traditional input actions such as mouse, stylus and keyboard entries may also be utilized to select to interact with conversations displayed in the communication application 202.

Figure 3A:
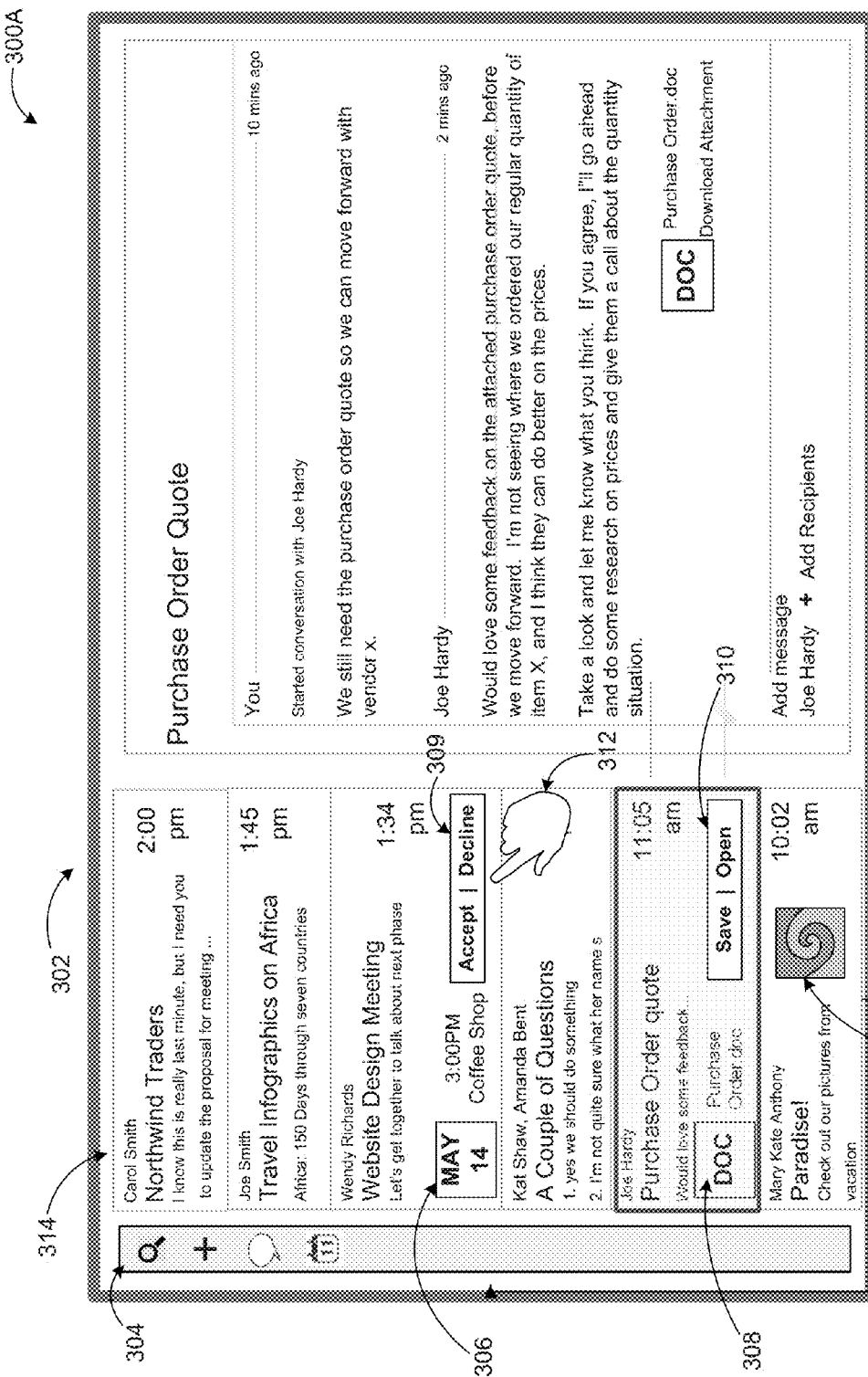
FIGS. 3A and 3B illustrate example template visualizations enabling actions to be taken from the list of conversations.
Figure 3B:
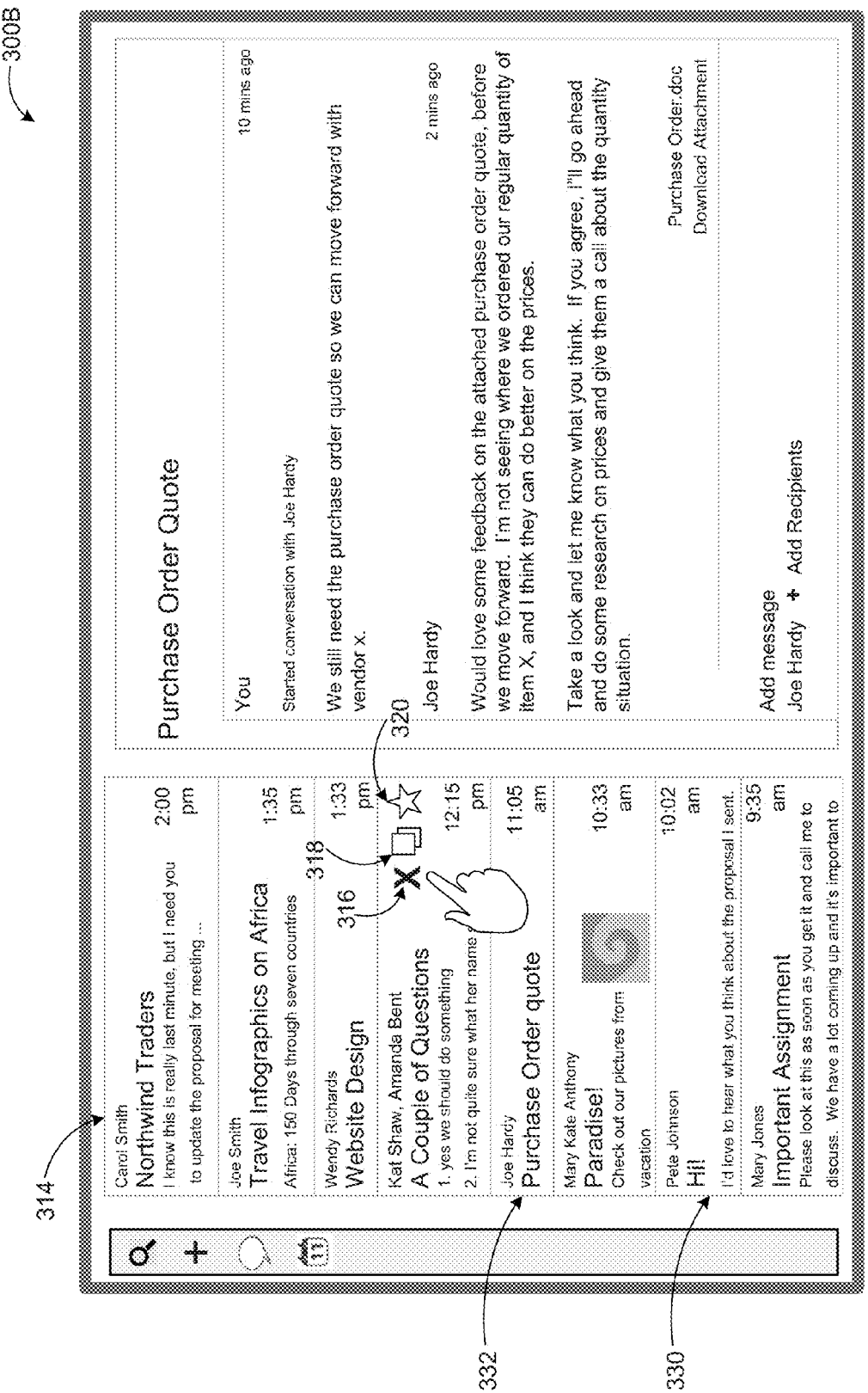

FIGS. 3A and 3B illustrate example template visualizations enabling actions to be taken from the list of conversations, according to some example embodiments.

In a system according to embodiments, different templates may be used to present conversations in an inbox 314 of a communication application 302. The templates may include visually distinct layouts for presentation of information associated with each conversation. As previously discussed, a template may include presenting summary information of a sender, subject, and body of a conversation, and after the conversation is viewed, the template may change to a different template where the preview of the body of the conversation may be hidden.

As illustrated in diagram 300A, other templates may be employed to display additional information included in the body of the conversation, such as when the conversation includes an attachment, embedded items and/or images, a link to another item or website, a calendar and/or meeting request, as some examples. An example template for such a conversation may display summary information about the conversation including the sender, subject, and time/date information, and may also display a short preview of the body and an icon indicating a type of item included in the conversation. For example, if the conversation includes an attached document, a document icon 308 may be displayed in a preview template of the conversation in the inbox 314. Similarly, a thumbnail 324 of an attached or embedded image may displayed in the preview template of the conversation, and if the conversation includes a meeting request, a calendar icon 306 with the date of the request may be displayed in the preview template of the conversation in the inbox 314.

In a further embodiment, the preview template of the conversation in the inbox 314 may enable the user to take an action from the template without having to open the conversation in a separate viewing pane. For example, an option 310 to save or open the attached document may be presented next to the document icon 308. The user may select to save the attachment to the user's client device or open the attachment from the inbox, without opening the conversation. In another example, the user may select the thumbnail 324 of an attached image displayed in the preview to open the image in a full screen view for viewing the image without opening the conversation. In yet another example, an accept/decline request option 309 may be presented in the preview when the conversation includes a request to schedule a meeting, call or other event. The user may select to accept the event from the preview template, and the event may be automatically added to the user's calendar without the user having to open the conversation and navigate to a separate calendar interface or calendar application. Furthermore, the user may receive a poll or questionnaire, and the user may be able to respond to the poll or questionnaire directly from the conversation in the inbox without having to open the conversation to a full view.

As illustrated in diagram 300B, the template may update after a user interacts with a conversation. For example, after the user selects to take an action from the conversation, such as saving a document, or accepting an event, the template may update to hide the displayed attachment, image, or calendar icon. For example, the conversation including the attached document may be reduced to a new template 332 to display more brief information such as the sender, subject and time and date information only in order to minimize the space the conversation occupies in the inbox and to enable additional messages 330 to be displayed in the inbox 314.

In another example embodiment, as also illustrated in diagram 300B, template visualizations for a list of conversations in the inbox 314 may include additional annotations to enable additional actions to be taken directly from the inbox. Some example annotations enabling actions to be taken may be a delete action 316, a hide action 318, and a star action 320. The delete action 316 may enable the user to automatically move the conversation to a trash folder of the communication application. The hide action 318 may temporarily hide the conversation from the inbox 314 to enable additional conversations to be displayed. The star action 320 may enable the user to mark the conversation as important so that the user can quickly scan the inbox to identify important messages. The described actions are meant to be exemplary of actions that may be taken directly from a conversation displayed in the inbox 314. Many other actions may be available and displayed as annotations on the template visualizations for conversations in the inbox. Other actions may be to group conversations together, delay delivery of the conversation until another time, schedule a follow up reminder, and other similar actions.

Figure 4:
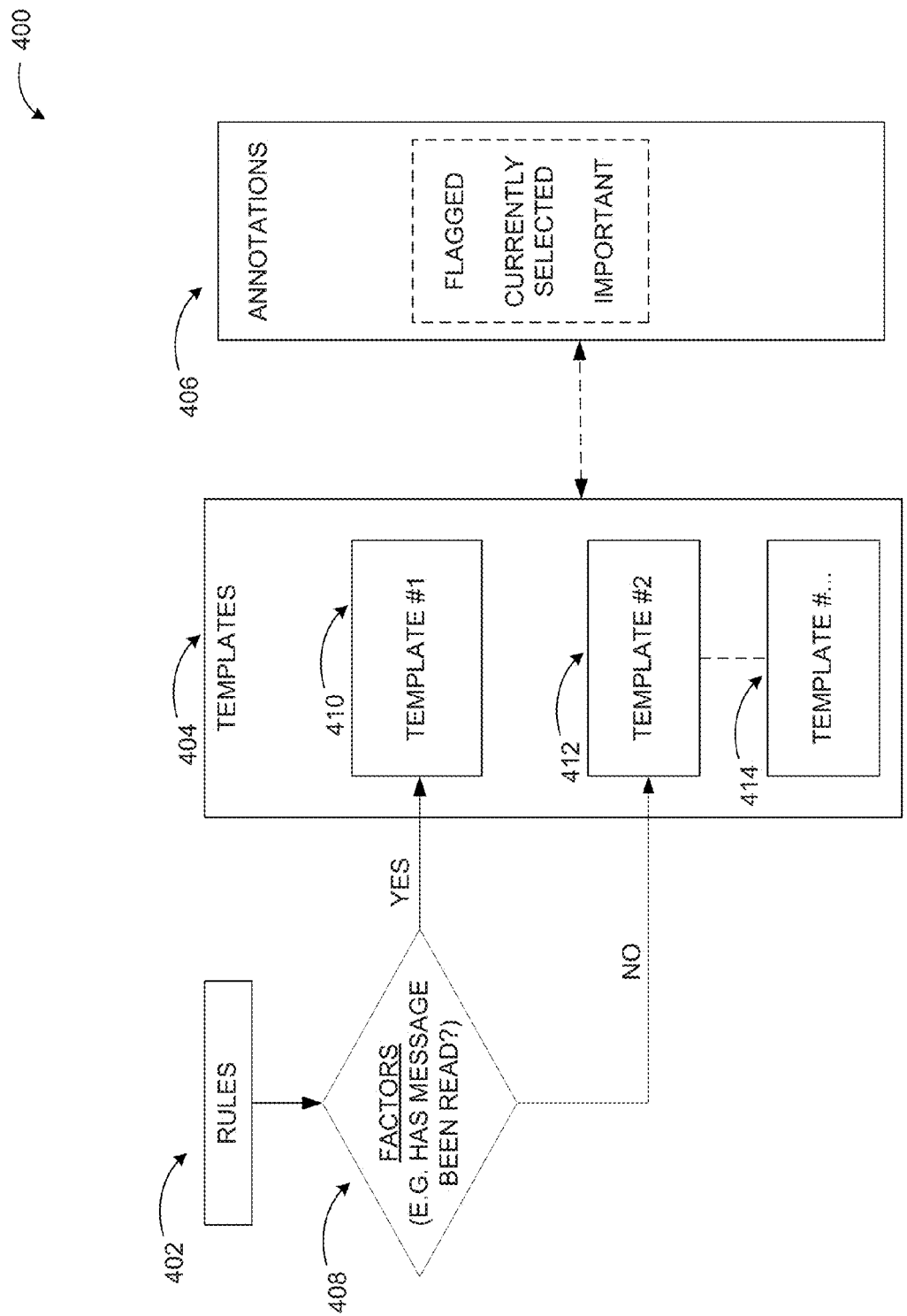
FIG. 4 illustrates an example schematic for applying visualizations to items in a communication application.

FIG. 4 illustrates an example schematic for applying visualizations to items in a communication application, according to some example embodiments.

As previously described, a system for visualizing conversations in an inbox of a communication application may involve a collection of templates 404, rules 402, factors 408, and annotations 406. The collection of templates 404 may include visually distinct layouts for presentation of information associated with a conversation in the inbox. The annotations 406 may include additional information that may be applied to a template to modify the template and to provide additional information about the conversation.

The rules may be applied to determine the template and annotations to display for any given item or conversation in the inbox. For example, a rule may be: if the item is a conversation the user has read or viewed before, then use a first template 410, and if the item is a conversation that the user has not seen before, then use another template 412. Any number of templates 414 may be provided in the collection of templates 404 to provide multiple visualization options for presenting information and conversations in the communication application. In another implementation with a multitude of additional rules, the rules may be prioritized so that if more than one rule's conditions are satisfied, the outcome is not ambiguous, and a particular rule may receive priority over another rule meeting the same conditions. Furthermore, the rules may be dynamically evaluated and updated as the system receives user input, so that as the user interacts with the communication application, the system may observe user behavior and preferences, and may determine a most appropriate template based on the user's interaction.

In an additional embodiment, the system may employ behavior modeling in addition to the rules to pick the most appropriate templates for visualizing conversations. The behavior modeling may gather feedback based on user interaction and adjust template selection appropriately. For example, if a user is having to open every item to see an expanded view of it, then that action may imply that the templates do not provide enough preview information, and the templates may be updated to provide more information to enable the user to preview the item and take action on at least some of the items without having to open them.

Additionally, after a template has been selected for visualizing a conversation, one or more annotations 406 may be provided along with the template to provide additional information. Example annotations may be a color scheme, graphical scheme, highlighting scheme applied to an item, and may also include icons, indicators, and selectable options displayed with a conversation. For example, an annotations may indicate a currently selected item, a flagged item for follow up, or that an item has been marked as important.

In a system according to embodiments, the rules 402 may test one or more of the factors 408 to determine the templates 404 and annotations 406 to apply to a visualization for an item or conversation. Factors may be inputs or signals that the rules test. In the example rule described above, the factor is whether or not the message has been read. A multitude of other factors may be considered by the rules to determine templates and annotations. Some example factors may include a source of the communication application including a web browser, a local communication application, and a social networking application, a sender identity, an unsent draft, one or more recipients of the conversation, a conversation the user has sent to himself, a number of messages in the conversation, past interaction with the item such as whether it has been flagged, selected, opened, and how often it has been selected and opened, and an item count including a number of items in the inbox and a rate of the incoming items. Yet other factors may include an age of an item, where the item is displayed in the flow of the inbox, a zoom level of the item or the inbox, and defined user preferences. For example, the user may define a set of preferred display options for certain types of conversations, and the user preferences may take precedence when the system determines visualizations for items in the communication application.

The examples described above in FIG. 2 through 4 are shown with specific components, visualizations, and configurations. Embodiments are not limited to systems according to these example visualizations and configurations. Providing a system for visualizing items in a communication application may be implemented in configurations employing fewer or additional components in applications and user interfaces. Furthermore, while the examples have been described in the context of messages, conversations such as emails, instant messages, and recorded audio and video conversations may be organized, prioritized, and arranged with similar actions as described above.

Figure 5:
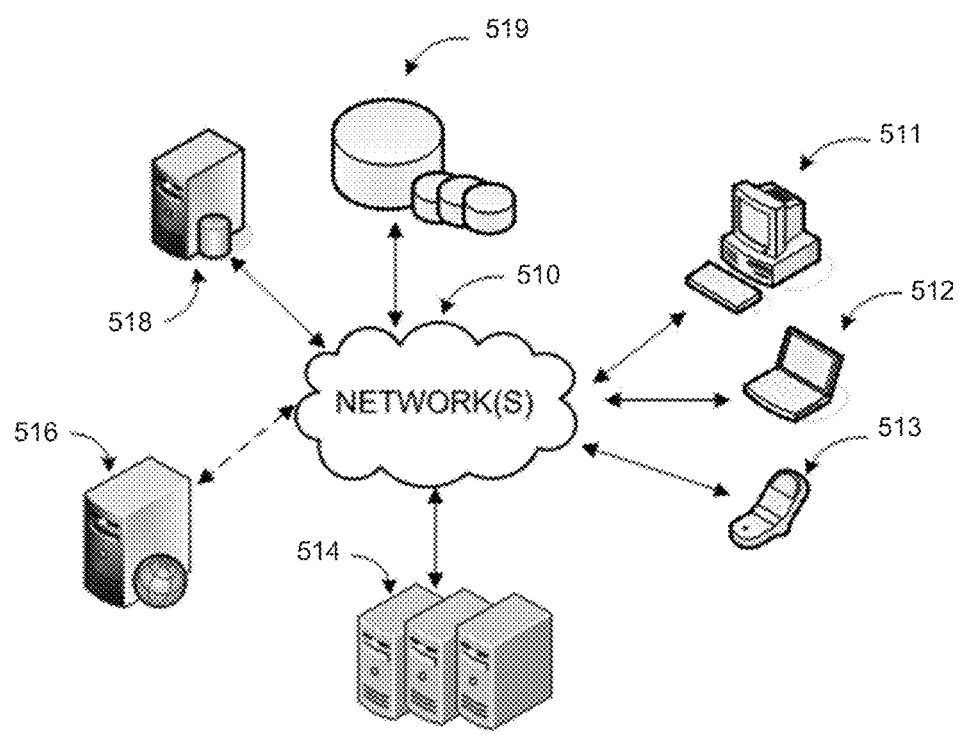
FIG. 5 is a networked environment, where a system according to embodiments may be implemented.

FIG. 5 is an example networked environment, where embodiments may be implemented. A system for visualizing items in a communication application may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. An application executed on one of the servers may facilitate determining visualizations for items presented in an inbox. The application may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform for providing a system for visualizing items in a communication application. Furthermore, the networked environments discussed in FIG. 5 are for illustration purposes only. Embodiments are not limited to the example applications, modules, or processes.

Figure 6:
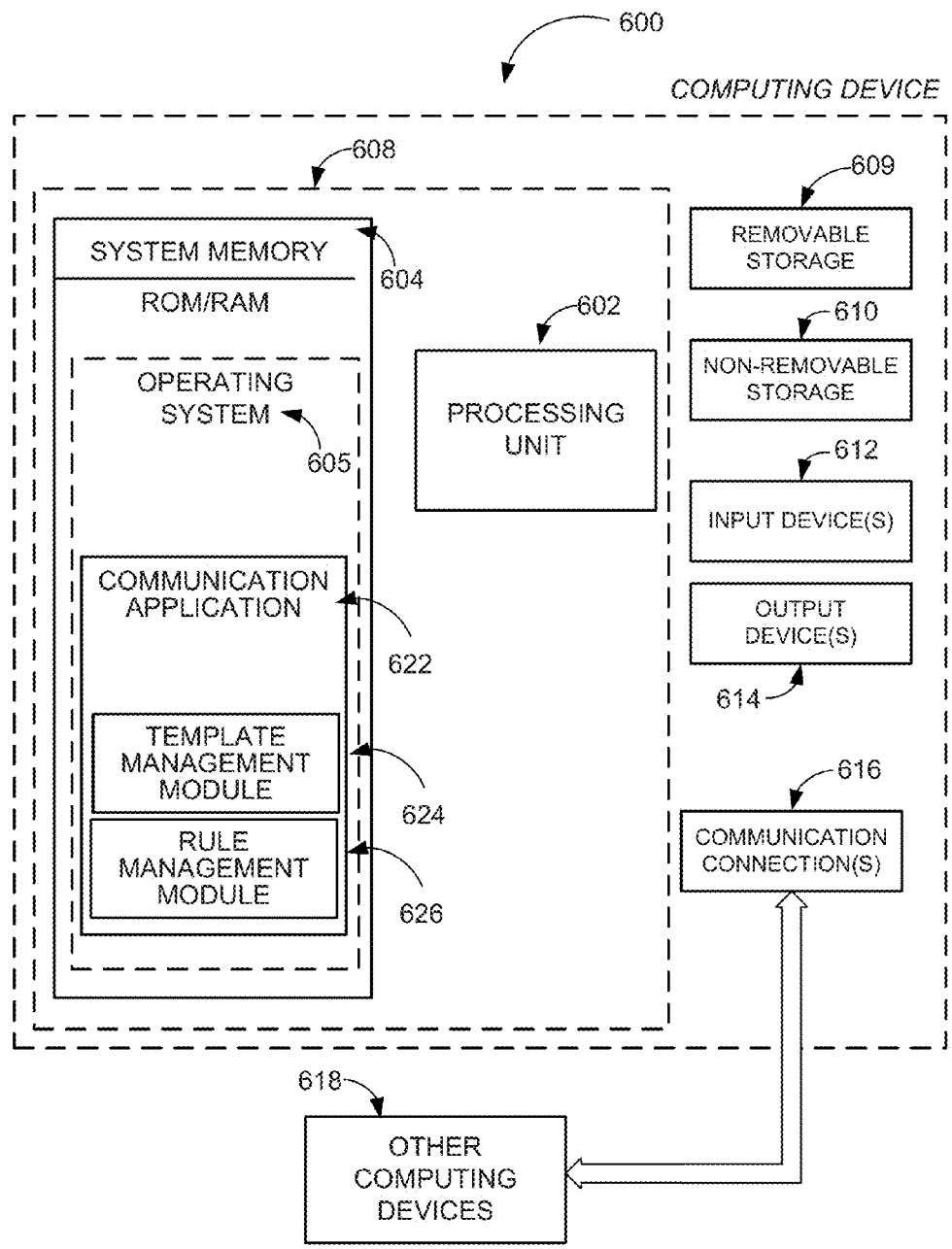
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application for providing a system for visualizing items and conversations in a communication application according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as communication application 622, a template management module 624, and a rule management module 626.

Communication application 622 may facilitate conversation exchange including emails, instant messages, and audio/video conferencing. Conversations may be presented in a list associated with the communication application 622 for providing a preview of exchanged conversations. A template management module 624 may be configured to provide visualizations of each item presented in the list to provide appealing and useful information about each item to a user to enable the user to preview what the item is about and to take action on the item based on the provided information. A rule management module 626 may apply a set of rules to determine an appropriate template visualization based on a set of factors and predefined rules. The communication application 622, template management module 624, and rule management module 626 may be separate applications or integrated modules of a hosted service. For example, communication application 622 may be a browser accessing an email service and may be integrated with other content sharing applications such as instant messaging applications, video conferencing applications, and calendar applications. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s)

that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
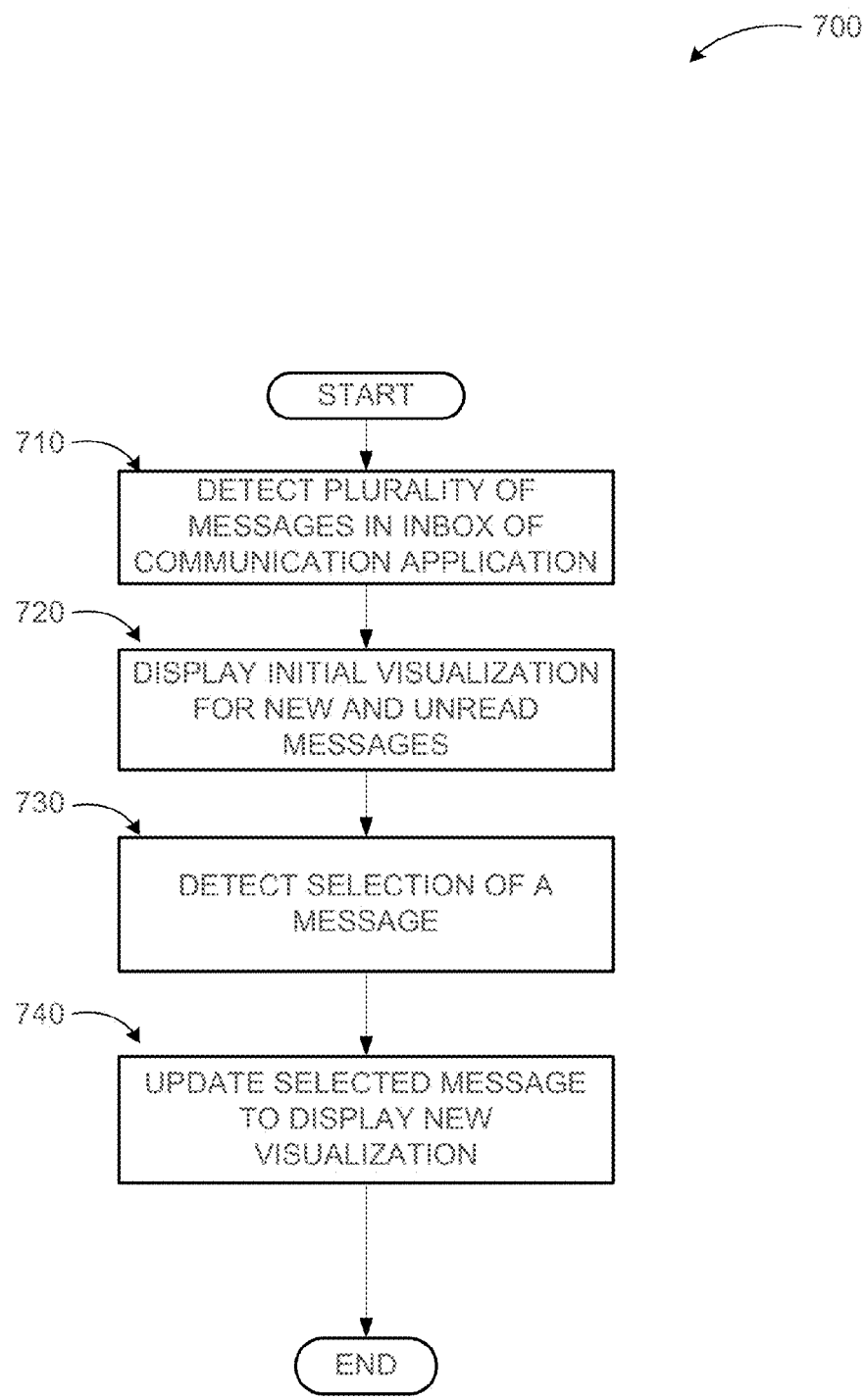
FIG. 7 illustrates a logic flow diagram for a process of providing a system for visualizing items and conversations in a communication application, according to embodiments.

FIG. 7 illustrates a logic flow diagram for process 700 of providing a system for visualizing items and conversations in a communication application, according to embodiments. Process 700 may be implemented on a computing device or similar electronic device capable of executing instructions through a processor.

Process 700 begins with operation 710, where a plurality of messages received through a communication application may be detected. Operation 710 may be followed by operation 720 where an initial visualization for new and unread messages displayed in an inbox of the communication application may be displayed. Operation 720 may be followed by operation 730 where a selection of a message from the plurality of messages displayed in an inbox of the communication application may be detected. The message may be selected employing touch and gesture input as well as through mouse, stylus and keyboard input.

Operation 730 may be followed by operation 740 where the selected message may be updated to display a new visualization. The new visualization may provide less information such that the selected message may occupy less space in the inbox. The new visualization may be selected from a collection of templates. Each template in the collection of templates may include a distinct visual layout for a message displayed in the inbox.

The operations included in process 700 are for illustration purposes. Providing a system for visualizing items and conversations in a communication application may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed in a computing device for providing visualizations for conversations in a communication application, the method comprising:

displaying an initial visualization for new and unread items displayed on a user interface of the communication application;

detecting a selection of an item from one or more items in the initial visualization;

applying a weight factor and a set of rules to select a template and an annotation for the selected item, wherein the weight factor is based on a source of the communication application and a user preference, the template includes an option to respond directly to one or more of: a meeting, a call, a poll, and an event request included in the selected item without opening the selected item, and the annotation includes icons, indicators, and selectable options associated with the selected item, wherein at least one of the indicators includes a vertical bar indicator configured to change one of: a width and a color based on a frequency of interactions with the selected item;

establishing a priority for one or more of the set of rules such that one rule is applied to the selected item if two or more rules are determined to be applicable concurrently to the selected item;

selecting a new visualization from a collection of templates and annotations based on user interaction with the communication application and applying the prioritized set of rules;

updating the selected item to display the new visualization that provides a summary information of the selected item and the selected annotation on the user interface; and dynamically updating the set of rules based on detected user interaction with the selected item displayed on the user interface.

2. The method of claim 1, wherein the annotation is independent of a displayed visualization.

3. The method of claim 1, further comprising:

upon detection of selection of the item, displaying an annotation to indicate the item as a currently selected item.

4. The method of claim 3, wherein displaying the annotation to indicate the currently selected item further comprises:

displaying one or more of: a coloring scheme, a shading scheme, a blocking scheme, a highlighting scheme, and a graphical scheme associated with the currently selected item.

5. The method of claim 1, further comprising:

selecting a template for the new visualization displaying a thumbnail view of one or more of: an attached document and an embedded image associated with the selected item.

6. The method of claim 5, further comprising:

selecting a template for the new visualization to enable an action to be taken directly on the displayed item.

7. The method of claim 6, further comprising:

displaying a received questionnaire on the displayed item; and presenting an option to directly respond to the questionnaire from the displayed item.

8. The method of claim 6, further comprising:

presenting an option to at least one of: open, save, download, and delete the attached document from the displayed item while leaving the item on the user interface.

9. The method of claim 1, further comprising:
displaying a calendar icon in the new visualization for one of: a meeting, a call, a poll, and an event request included in the item, wherein the calendar icon includes a requested date and a time information; and
presenting an option to accept or decline the request directly on the displayed item.

10. A computing device for providing visualizations for conversations in a communication application, the computing device comprising:
a memory;
a display; and
a processor coupled to the memory and the display, the processor configured to provide a user interface associated with a communication application, wherein the communication application is configured to:
display an initial visualization for new and unread messages displayed on a user interface of the communication application;
detect a selection of a message from one or more messages in the initial visualization;
apply a weight factor to a set of rules to select a template and an annotation for the selected message, wherein
the weight factor is based on a source of the communication application and a user preference,
the template includes an option to respond directly to one or more of: a meeting, a call, a poll, and an event request included in the selected message without opening the selected message, and
the annotation includes icons, indicators, and selectable options associated with the selected message, wherein at least one of the indicators includes a vertical bar indicator configured to change one of: a width and a color based on a frequency of interactions with the selected message;
establish a priority for one or more of the set of rules such that one rule is applied to the selected message if two or more rules are determined to be applicable concurrently to the selected message;
select a new visualization from a collection of templates and annotations based on user interaction with the communication application and apply the prioritized set of rules;
update the selected message to display the new visualization that provides a summary information of the selected message and the selected annotation on the user interface; and
dynamically update the set of rules based on detected user interaction with the selected message displayed on the user interface.

11. The computing device of claim 10, wherein the annotation further includes one or more of: a coloring scheme, a shading scheme, a blocking scheme, a highlighting scheme, and a graphical scheme including icons.

12. The computing device of claim 10,
the weight factor is further based on at least one from a set of: a message source, a sender, recipients, a priority, and an item count.

13. The computing device of claim 10, wherein the communication application is further configured to:
enable user interaction with messages displayed on the user interface through one or more of: a touch input, a gesture input, a keyboard input, a mouse input, a pen input, a voice command, and an eye-tracking input.

14. A computer-readable memory device with instructions stored thereon for providing visualizations for conversations in a communication application, the instructions comprising:
displaying an initial visualization for new and unread messages displayed on a user interface of the communication application;
detecting a selection of a message from one or more messages in the initial visualization;
applying a weight factor to a set of rules to select a template and an annotation for the selected message, wherein
the weight factor is based on a source of the communication application and a user reference,
the template includes an option to respond directly to one or more of: a meeting, a call, a poll, and an event request included in the selected message without opening the selected message, and
the annotation includes icons, indicators, and selectable options associated with the selected message, wherein at least one of the indicators includes a vertical bar indicator configured to change one of: a width and a color based on a frequency of interactions with the selected message;
establishing a priority for one or more of the set of rules such that one rule is applied to the selected message if two or more rules are determined to be applicable concurrently to the selected message;
selecting a new visualization from a collection of templates and annotations based on user interaction with the communication application and apply the prioritized set of rules;
updating the selected message to display the new visualization that provides a summary information of the selected message and the selected annotation on the user interface; and
dynamically updating the set of rules based on detected user interaction with the selected message displayed on the user interface.

15. The computer-readable memory device of claim 14, wherein the
weight factor is further based on at least one from a set of a message source, a sender, recipients, a priority, and an item count.

* * * * *